United States Patent
Ohnishi et al.

[11] Patent Number: 5,942,839
[45] Date of Patent: *Aug. 24, 1999

[54] PIEZOELECTRIC VIBRATOR AND VIBRATORY GYROSCOPE USING THE SAME

[75] Inventors: Kazumasa Ohnishi; Katsutoshi Sakurai; Akihiko Ohashi, all of Niigata-ken, Japan

[73] Assignee: Alps Electric Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/706,201

[22] Filed: Aug. 30, 1996

[30] Foreign Application Priority Data

Aug. 31, 1995 [JP] Japan ..................... 7-223417

[51] Int. Cl.⁶ ..................................... H01L 41/08
[52] U.S. Cl. ........................ 310/359; 310/366; 310/370
[58] Field of Search ..................... 310/358, 359, 310/366, 370, 321, 316, 317, 319

[56] References Cited

U.S. PATENT DOCUMENTS

| | | | |
|---|---|---|---|
| 5,420,548 | 5/1995 | Nakajima | 310/366 X |
| 5,451,828 | 9/1995 | Tomikawa et al. | 310/370 |
| 5,691,595 | 11/1997 | Tomikawa et al. | 310/370 |
| 5,708,320 | 1/1998 | Ohnishi et al. | 310/321 |
| 5,824,900 | 10/1998 | Konno et al. | 310/370 X |
| 5,854,427 | 12/1998 | Terada et al. | 310/370 X |

FOREIGN PATENT DOCUMENTS

| | | | |
|---|---|---|---|
| 0040589 | 3/1979 | Japan | 310/370 |
| 0102889 | 8/1979 | Japan | 310/370 |

*Primary Examiner*—Mark O. Budd
*Attorney, Agent, or Firm*—Brinks Hofer Gilson & Lione

[57] ABSTRACT

A piezoelectric vibrator having three parallel vibrator arms formed from piezoelectric material in which dielectric polarization is generated through the application of electric fields extending widthwise between first electrodes formed on top surfaces thereof and between second electrodes formed on bottom surfaces, and also between the first and second electrodes through the piezoelectric material, such that a portion of the dielectric polarization occurs at the surfaces of the vibrator arms, and a portion also occurs within the vibrator arms. When ac driving voltages are applied to the electrodes, the vibrator arms vibrate at large vibration amplitudes due to strains created in the portion of dielectric polarization within the vibrator arms.

17 Claims, 6 Drawing Sheets

FIG. 3A (POLARIZATION)

FIG. 3B (DRIVING)

FIG. 3C (DRIVING)

FIG. 3D (DRIVING)

PIEZOELECTRIC VIBRATOR AND VIBRATORY GYROSCOPE USING THE SAME

BACKGROUND OF THE INVENTION

1. Field of the Invention

The present invention relates to a piezoelectric vibrator having a main vibrator body formed of piezoelectric material, and to a vibratory gyroscope whose operation is based on the detection of Coriolis force acting on the piezoelectric vibrator in a rotating system, and particularly to a piezoelectric vibrator for producing a large vibration amplitude signal while consuming a small amount of electric power, and to a vibratory gyroscope using this piezoelectric vibrator.

2. Description of the Related Art

A first conventional piezoelectric vibrator used in vibratory gyroscopes typically includes an elastic member, formed from an elastic alloy such as elinvar, and piezoelectric elements glued to the surfaces of the elastic member. The elastic member is vibrated by applying an alternating current (ac) voltage across the piezoelectric elements, thereby causing vibratory deformation of the piezoelectric elements which results is vibration of the elastic member. However, these first conventional piezoelectric vibrators have a poor driving efficiency due to frictional losses during the energy transfer between the piezoelectric elements and the elastic member. Because of this poor driving efficiency, it is necessary to apply an undesirably high ac voltage to the piezoelectric elements in order to vibrate the elastic member at a desired vibrational amplitude.

A second conventional piezoelectric vibrator avoids the problems associated with the first conventional vibrator by forming the vibrator entirely from a piezoelectric material, such as a piezoelectric ceramic. This produces a better driving efficiency and yields a larger strain from a lower application voltage as compared with the above-mentioned first conventional vibrator.

Figure 8A:
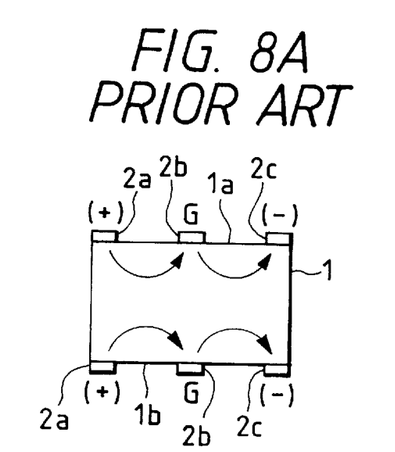
FIG. 8A shows the voltages applied for producing the conventional dielectric polarization.
Figure 8B:
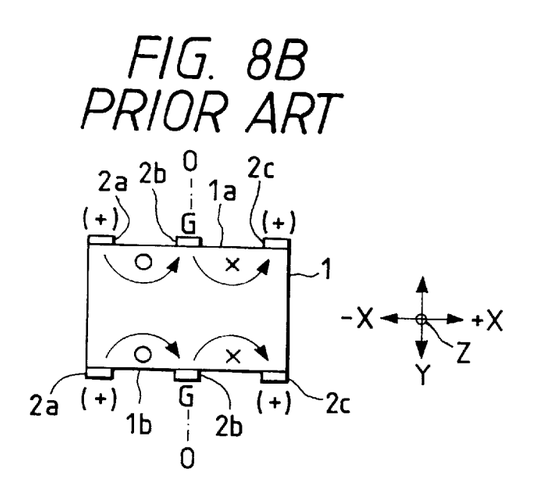
FIG. 8B shows driving of the piezoelectric vibrator.

FIGS. 8A and 8B show front surfaces of an example of the second conventional piezoelectric vibrator formed from piezoelectric ceramic. A main vibrator body 1 has a flat shape and includes a cantilever structure which extends in the z-axis direction (normal to the drawing). Formed on the top and bottom surfaces 1a and 1b of the main vibrator body 1 are electrodes 2a, 2b and 2c which also extend in the z-axis direction. To polarize the main vibrator body 1, a positive voltage is applied to electrodes 2a, a negative voltage is applied to the electrodes 2c, and the middle electrodes 2b are grounded. The resulting electric fields between the electrodes 2a and 2b on both surfaces 1a and 1b produce a dielectric polarization which is depicted by arrows provided in FIGS. 8A and 8B, and a similar dielectric polarization is also produced between the electrodes 2b and 2c.

In operation, to vibrate the main vibrator body 1 in the x-axis direction, an ac driving voltage (such as that shown in FIG. 7A) is applied to the electrodes 2a and 2c in the same phase relation while the middle electrode remains grounded, as shown in FIG. 8B. When a positive voltage is applied to the electrodes 2a and 2c, at a particular point in time, sections of the main vibrator body 1 (which are marked "O" in FIG. 8B) have a positive strain (expansion) and sections marked "x" have a negative strain (contraction), causing the main vibrator body 1 to bend in the +x direction with respect to the neutral plane O—O. When the ac driving voltage applied to the electrodes 2a and 2b is reversed (negative), the main vibrator body 1 bends in the -x direction. Thus, application of the ac driving voltage causes the main vibrator body 1 to vibrate (repeatedly bend) in the -x and +x directions (the x-axis direction).

Piezoelectric vibrators of the above-mentioned second conventional type are used in various kinds of instruments. For example, in a vibratory gyroscope, when the main vibrator body 1 is rotated around the z axis while being vibrated in the x-axis direction, vibrational components in the y-axis direction are caused by Coriolis force. The main vibrator body 1 therefore has a motion which is a combination of the driving vibration in the x-axis direction and the vibrational components in the y direction caused by Coriolis force. By extracting the vibration component in the y-axis direction caused by the Coriolis force in the form of voltage changes through the electrodes, the angular velocity of the gyroscope can be detected.

The piezoelectric vibrator having its main vibrator body 1 formed from piezoelectric material, as shown in FIGS. 8A and 8B, has a better driving efficiency than that of the above-mentioned first conventional piezoelectric vibrator in which the strain of piezoelectric material is propagated to the constantly-elastic material.

However, the prior art piezoelectric vibrator shown in FIGS. 8A and 8B produces dielectric polarization only between the electrodes aligned on each of the top surface 1a and bottom surface 1b of the main vibrator body 1. Therefore, the positive strain indicated with the symbol "O" and negative strain indicated with the symbol "x" created on the surfaces 1a and 1b in response to application of the ac driving voltage produce a relatively small bending moment in the x-axis direction. Specifically, the positive strain and negative strain created at a particular point in time between the electrodes 2a and 2b and between the electrodes 2b and 2c on the top surface 1a are localized at the surfaces 1a and 1b, and therefore these strains do not produce a large bending moment around the neutral plane O—O.

Accordingly, improvements in the driving efficiency of the second conventional piezoelectric vibrator over that of the first conventional piezoelectric vibrator is limited. That is, in order to drive the main vibrator body 1 to produce a large vibration amplitude in the x-axis direction, it is necessary to apply a high ac driving voltage to the electrodes 2a and 2b. Therefore, it is not possible to produce large-amplitude vibrations in response to an ac driving signal which consumes a small amount of power.

SUMMARY OF THE INVENTION

The present invention is intended to solve the foregoing deficiency of the conventional piezoelectric vibrators, and its prime object is to provide a piezoelectric vibrator having a main vibrator body formed from piezoelectric material which yields a large vibration amplitude while consuming a small amount of power based on a large bending moment produced from an applied ac driving power, and to provide a vibratory gyroscope using this piezoelectric vibrator.

In accordance with the present invention, a piezoelectric vibrator includes a main vibrator body including a plurality of vibrator arms, the vibrator body being formed from piezoelectric material, and electrodes formed on the parallel top and bottom (first and second) surfaces of the vibrator arms, wherein the vibrator arms develop dielectric polarization between the electrodes of each surface (for example, between the electrodes formed on the top surface, and between the electrodes formed on the bottom surface) and between the electrodes formed on opposing surfaces (for example, between an electrode formed on the surface and an electrode formed on the bottom surface), and wherein the vibrator arms vibrate in a plane parallel to the top and bottom surfaces in response to the application of ac power to the electrodes.

The above-mentioned dielectric polarization can be accomplished by applying a voltage between the electrodes formed on each of the top surface and the bottom surface, and by applying a voltage between the electrodes formed on the opposing top and bottom surfaces. Applying ac driving power to the electrodes in this manner creates strains in the piezoelectric material at the top and bottom surfaces, and also creates strains at sections between the top and bottom surfaces. Consequently, a large bending moment acts on each vibrator arm with respect to the neutral plane, resulting in a large vibration amplitude.

The electrodes are formed along opposite edges of the top and bottom surfaces of each vibrator arm and are spaced apart in the vibration direction of the vibrator arm (will be called the width direction), so that polarization occurs in a direction perpendicular to the width direction between the electrodes located at the edges on the top surface and the bottom surface.

When the driving power is applied to the electrodes located at the opposing edges of the vibrator arm, strains are created in sections of piezoelectric material located along the sides of the vibrator arms extending between the top and bottom surfaces. These strains are created at a maximum distance from the neutral plane of each arm (which bisects each arm into two half-width pieces), thereby producing a maximum bending moment acting on the vibrator arm, and accordingly producing a large bending moment while consuming a minimum amount of power.

The voltage applied to the electrodes located at the edges on the top and bottom surfaces is preferably set such that the resulting electric field strength acting between electrodes located on opposing (top and bottom) surfaces is preferably equal to or greater than the electric field strength between electrodes located on the same surface.

For a section of piezoelectric material located on one side of the neutral plane, if the electric field strength between a first electrode located at the edge and a second electrode located on the same (top or bottom) surface is equal to the electric field strength between the first electrode and a third electrode located on the edge of the other (bottom or top) surface, then the strain created by the first and second electrodes and the strain created by the first and third electrodes are well balanced and the vibrator arm has a uniform bending strain, resulting in a well-balanced driving. With the voltage applied to the electrodes located at the edges, if the electric field strength between the first and second electrodes is greater than the electric field strength between the first and third electrodes, then the strain increases progressively as the distance from the neutral plane increases.

The present invention also pertains to a vibratory gyroscope made up of the piezoelectric vibrator mentioned above, with a detecting electrode being provided on any of the vibrator arms, so that the detecting electrode detects a vibration component on the vibrator arm caused by the Coriolis force when the vibrating piezoelectric vibrator is placed in a rotating system.

For example, when the main vibrator body includes a base section and three vibrator arms extending in parallel from the base section, with driving power being applied to associated electrodes formed on the vibrator arms so that both outer vibrator arms and the middle vibrator arm vibrate in the opposite phases, the vibration component of Coriolis force is detected by the detecting electrode provided on any of the vibrator arms. This vibratory gyroscope has a superior vibration driving efficiency when compared to conventional vibratory gyroscopes, and it can be driven effectively using a smaller amount of power.

BRIEF DESCRIPTION OF THE DRAWINGS

FIGS. 1A, 1B and 1C are front views of vibrator arms of a vibratory gyroscope seen along the arrow I of FIG. 5, showing dielectric polarization based on a first embodiment of the present invention, of which

FIGS. 2A, 2B, 2C and 2D are front views of the vibrator arms, showing dielectric polarization based on a second embodiment of the present invention, of which

FIGS. 3A, 3B, 3C and 3D are front views of the vibrator arms, showing dielectric polarization based on a third embodiment of the present invention, of which

FIGS. 4A and 4B are front views of the vibrator arms, showing dielectric polarization based on a fourth embodiment of the present invention, of which

FIGS. 8A and 8B are diagrams showing dielectric polarization of a conventional piezoelectric vibrator, of which

DESCRIPTION OF THE PREFERRED EMBODIMENTS

Figure 5:
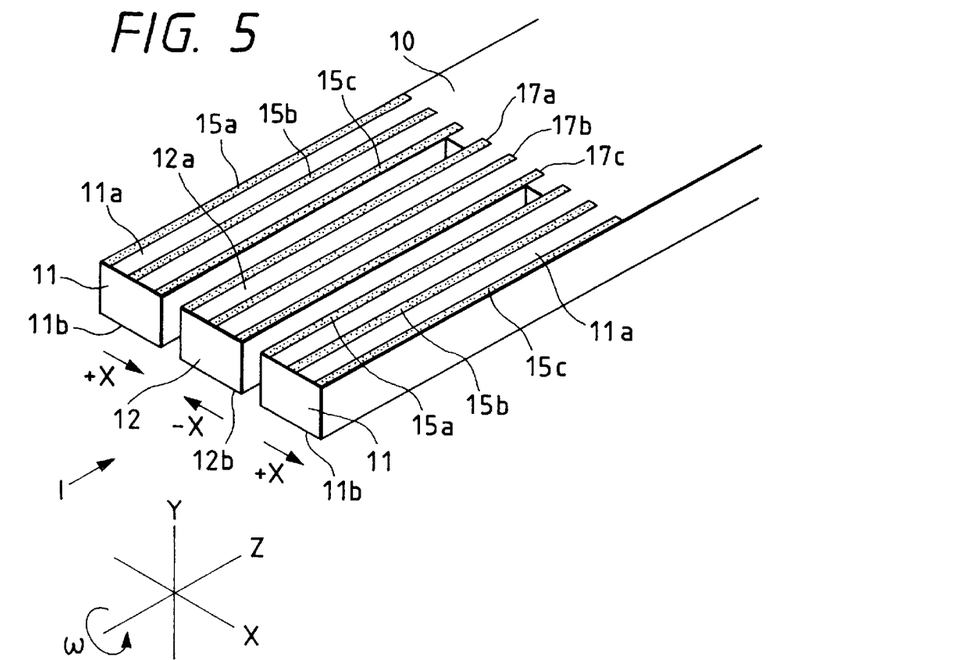
FIG. 5 is a perspective view of a three-arm vibratory gyroscope.

FIG. 5 shows a three-arm vibratory gyroscope using the piezoelectric vibrator of the present invention. The gyroscope includes a main vibrator body including a base plate 10 and three vibrator arms (outer vibrator arms 11, and middle vibrator arm 12 located between the outer vibrator arms) which extend in parallel from one end of the base plate 10. The main vibrator body is made of piezoelectric material such as piezoelectric ceramic. The outer vibrator arms 11 are driven to vibrate in a common first vibration phase, and the middle vibrator arm 12 is driven in a second vibration phase different from the first vibration phase of the vibrator arms 11.

FIG. 1 through FIG. 4 are front views of the three vibrator arms 11 and 12 as viewed along the arrow I of FIG. 5. The outer vibrator arms 11 have parallel, opposing top and bottom (first and second) surfaces 11a and 11b, and the middle vibrator arm has parallel, opposing top and bottom surfaces 12a and 12b. As shown in these figures, the outer vibrator arms 11 have electrodes 15a, 15b and 15c formed on the top surfaces 11a, and electrodes 16a, 16b and 16c formed on the bottom surfaces 11b. The middle vibrator arm 12 has electrodes 17a, 17b and 17c formed on the top surface 12a, and electrodes 18a, 18b and 18c formed on the bottom surface 12b. All electrodes extend in the axial direction (the z-axis direction) along the entire length of the vibrator arms 11 and 12, as shown in FIG. 5.

Figure 6:
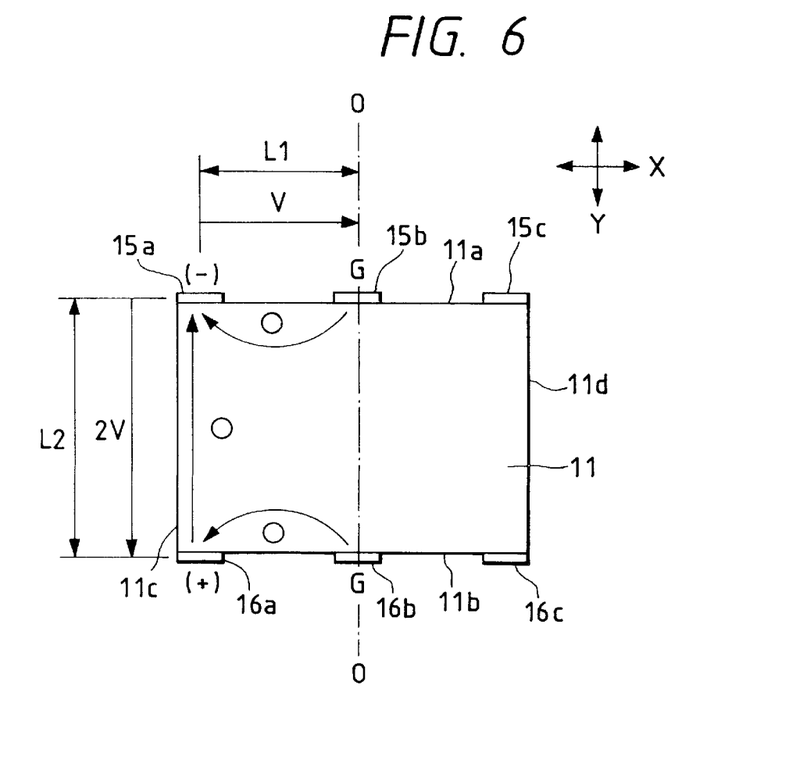
FIG. 6 is a detailed front view of the vibrator arm shown in FIGS. 1A to 1C.

The vibrator arms 11 and 12 are driven to vibrate in the x-axis (width) direction. The electrodes 15a, 15c, 16a, 16c, 17a, 17c, 18a and 18c are extend along the respective edges of the vibrator arms 11 and 12, while the electrodes 15b, 16b, 17b and 18b are located between the electrodes 15a and 15c, 16a and 16c, 17a and 17c, and 18a and 18c, respectively, and extend along a central portion of the vibrator arms 11 and 12. Because the vibrator arms 11 and 12 are driven to vibrate in the x-axis direction, the neutral plane O—O of bending in the driving direction coincides with the center in the x-axis direction of each vibrator arm, as shown in FIG. 6.

Figure 1A:
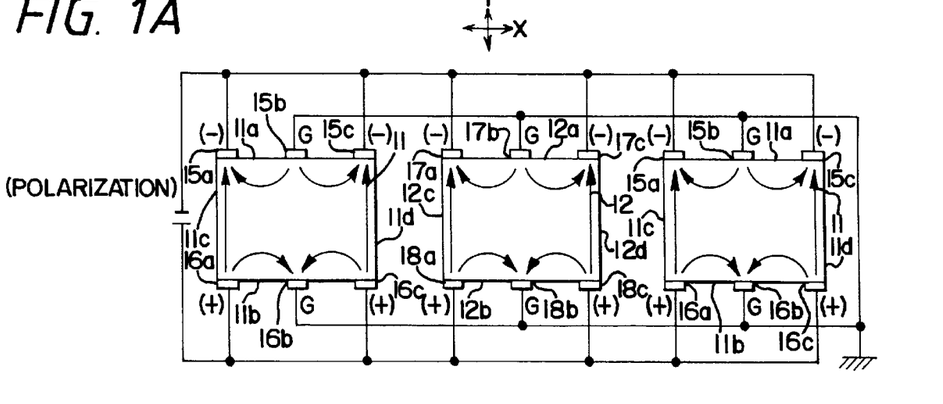
FIG. 1A shows the voltages applied to the electrodes for producing the dielectric polarization.
Figure 1B:
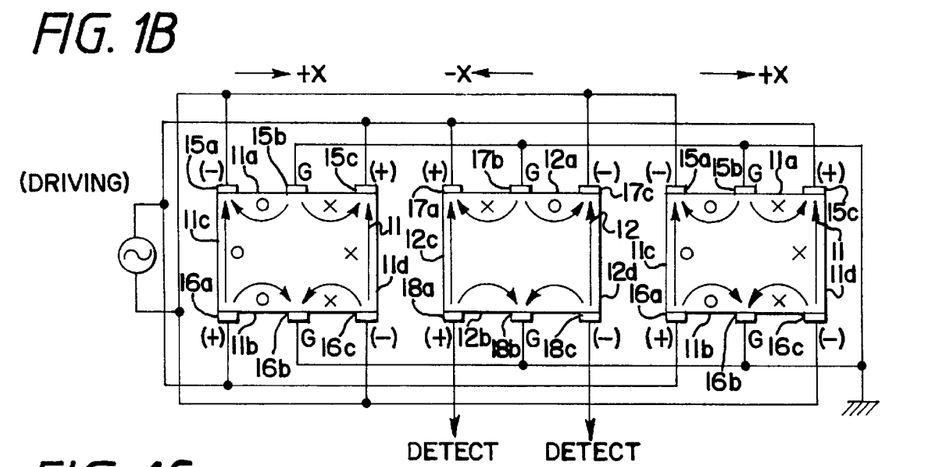
FIGS. 1B and 1C show the ac voltages applied to the electrodes for driving (vibrating) the vibrator arms in the x-axis direction.
Figure 1C:
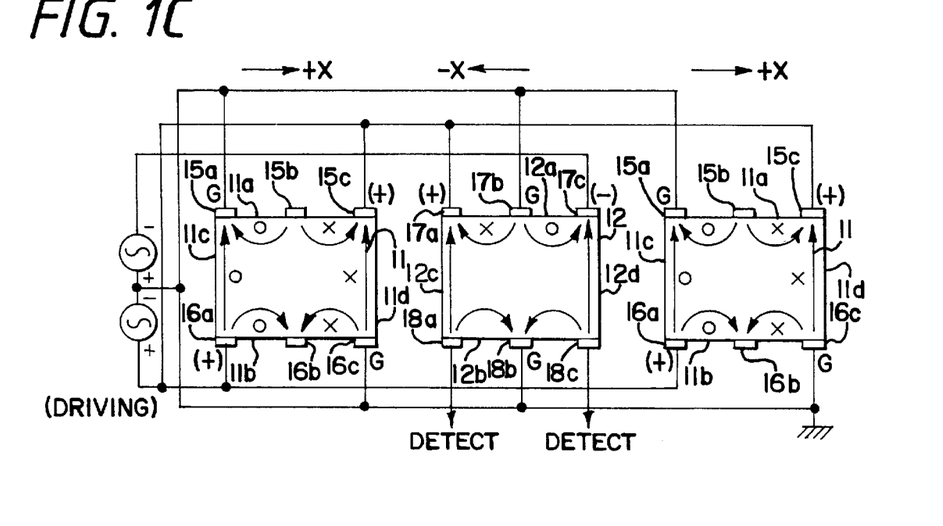
Figure 2A:
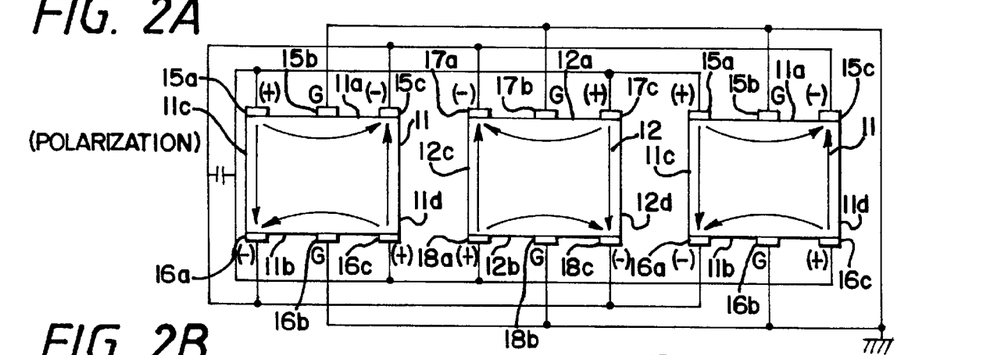
FIG. 2A shows the voltages applied to the electrodes for producing the dielectric polarization.
Figure 2B:
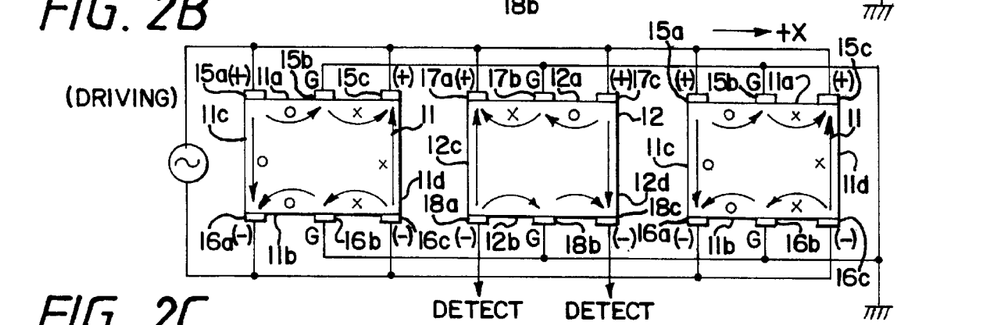
FIGS. 2B, 2C and 2D show the ac voltages applied to the electrodes for driving the vibrator arms in the x-axis direction.
Figure 2C:
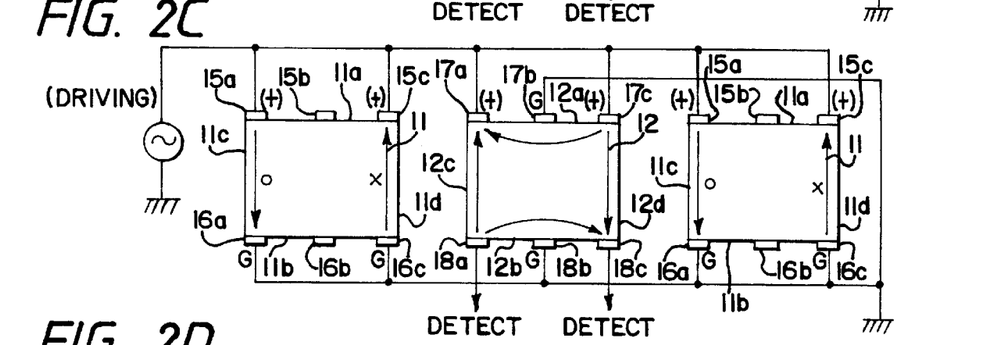
Figure 2D:
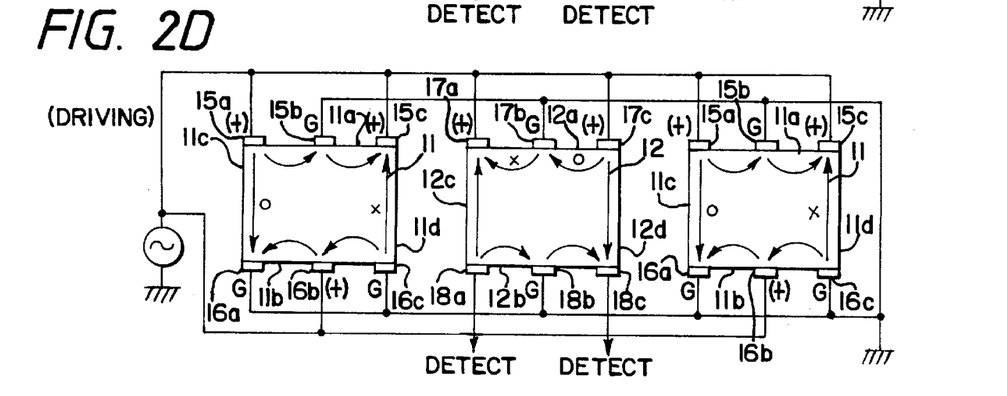
Figure 3A:
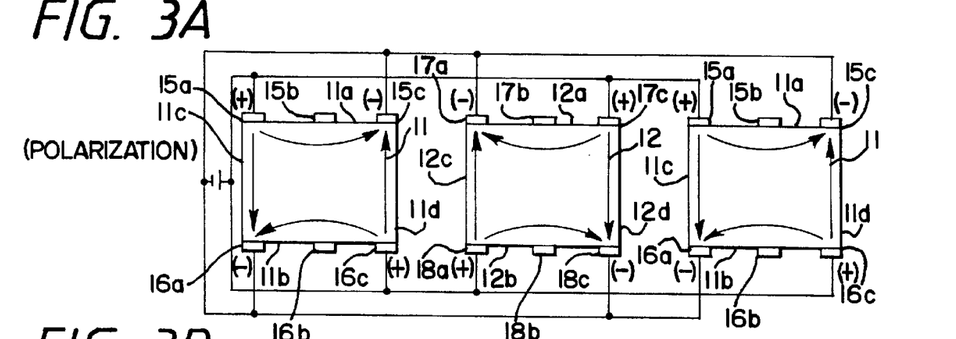
FIG. 3A shows the voltages applied to the electrodes for the producing the dielectric polarization.
Figure 3B:
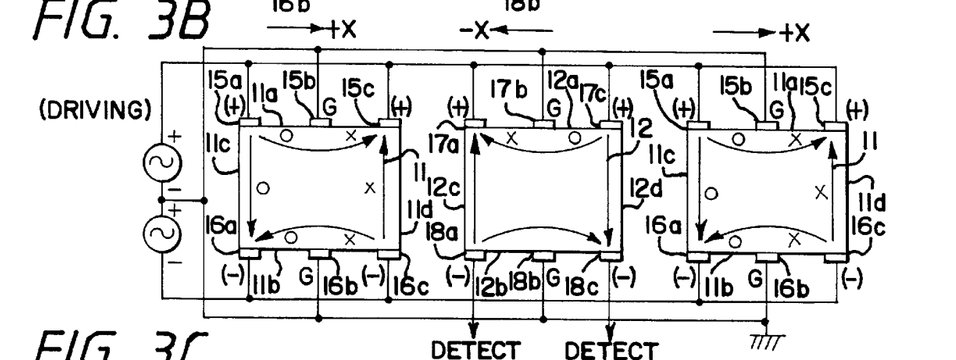
FIGS. 3B, 3C and 3D show the ac voltages applied to the electrodes for driving the vibrator arms in the x-axis direction.
Figure 3C:
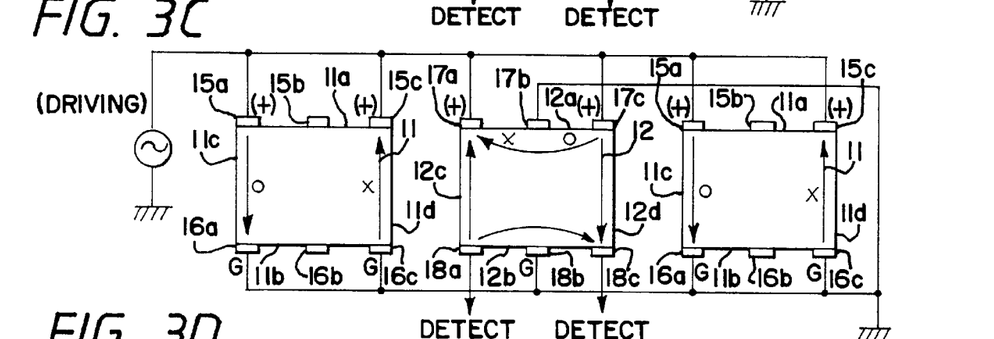
Figure 3D:
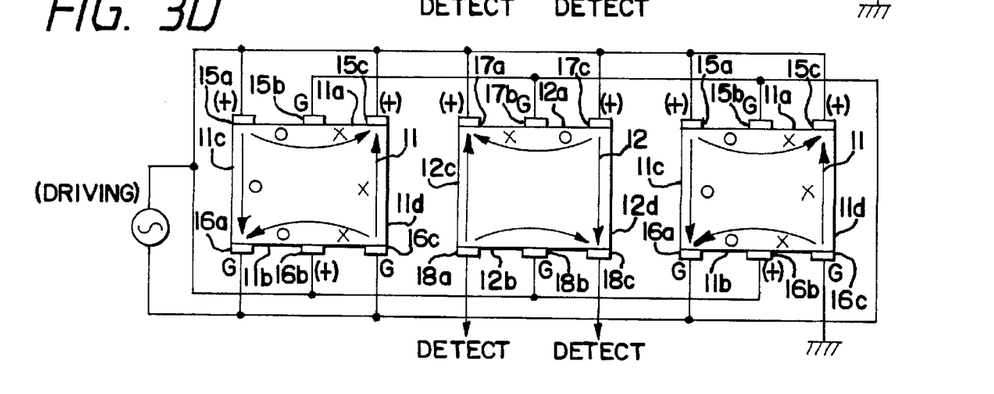
Figure 4A:
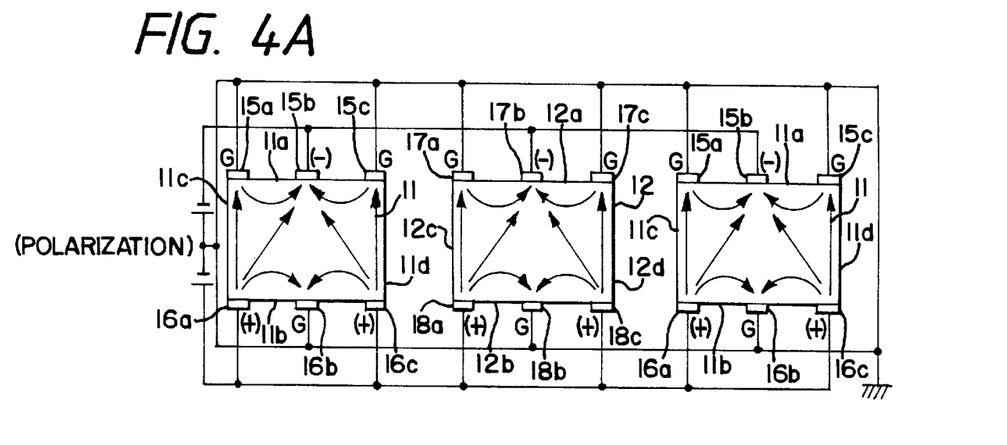
FIG. 4A shows the voltages applied to the electrodes for producing the dielectric polarization.
Figure 4B:
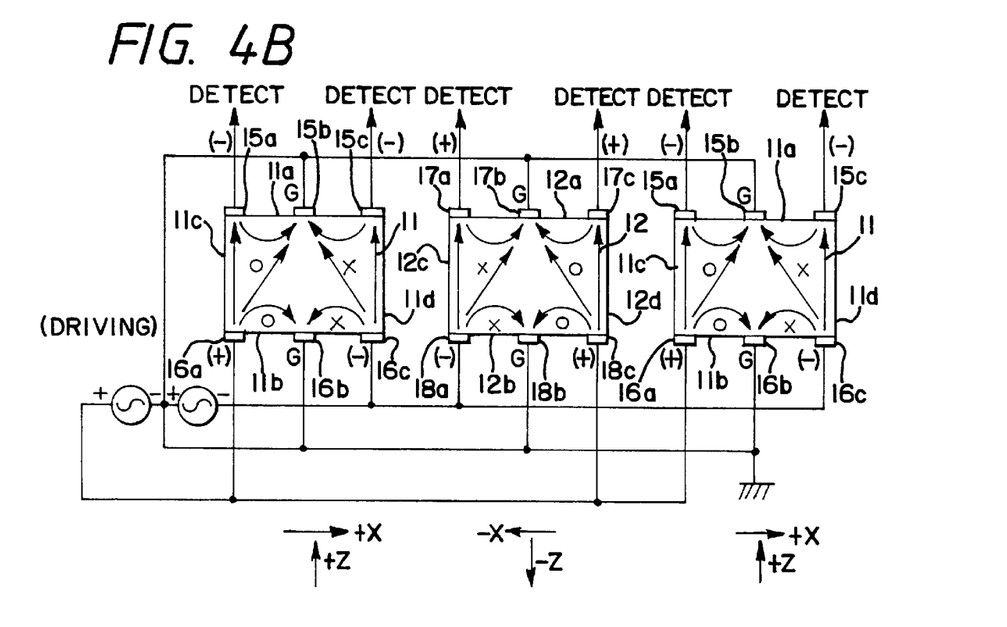
FIG. 4B shows the ac voltages applied to the electrodes for driving the vibrator arms in the x-axis direction.

FIGS. 1A to 1C show the first embodiment, FIGS. 2A to 2D show the second embodiment, FIGS. 3A to 3D show the third embodiment, and FIGS. 4A and 4B show the fourth embodiment of the present invention.

In FIGS. 1A, 2A, 3A and 4A, the symbols (+), (−) and G indicate positive, negative and ground voltage potentials applied to the electrodes for producing dielectric polarization in the vibrator arms.

Figure 7A:
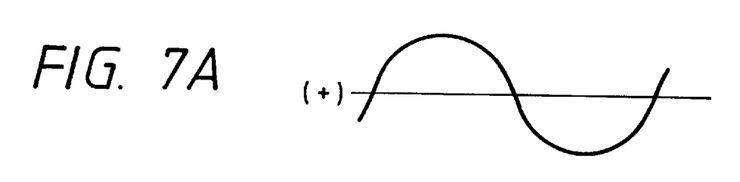
FIGS. 7A and 7B are waveform diagrams showing ac driving voltages having a 180° phase difference from each other.
Figure 7B:
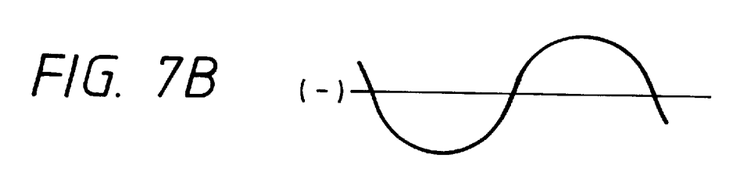

FIGS. 1B, 2B, 3B and 4B show the phase of the ac driving voltage which is applied to each electrode for driving (vibrating) the vibrator arms 11 and 12 in the x-axis direction. The symbols (+) and (−) located next to selected electrodes signify that positive and negative ac driving voltage signals (having a 180° (π) phase difference, as shown in FIGS. 7A and 7B) applied to these electrodes. Symbols "O" and "x" signify expansion and contraction, respectively, of the piezoelectric material generated in response to the ac driving voltage signals applied to the electrodes.

Referring to FIG. 1A, in the first embodiment, voltages are applied to each electrode for producing dielectric polarization. On the outer vibrator arms 11, the electrodes 15b and 16b at the center on the top and bottom surfaces are grounded, the electrodes 15a and 15c at the edges on the top surfaces 11a are supplied with a negative voltage, and the electrodes 16a and 16c at the edges on the bottom surfaces 11b are supplied with a positive voltage. On the middle vibrator arm 12, the electrodes 17b and 18b at the center of the top and bottom surfaces are grounded, the electrodes 17a and 17c at the edges on the top surface 12a are supplied with a negative voltage, and the electrodes 18a and 18c at the edges on the bottom surface 12b are supplied with a positive voltage. The arrows in FIG. 1A indicate the direction of the electric field produced between the electrodes, and the vibrator arms develop dielectric polarizations along the electric field.

On each of the top surfaces 11a and 12a of the vibrator arms 11 and 12, a dielectric polarization is produced which extends from the middle electrode 15b toward the outer electrodes 15a and 15c, and from the middle electrode 17b toward the outer electrodes 17a and 17c, as shown by the arrows in FIG. 1A. On the bottom surfaces 11b and 12b of the vibrator arms 11 and 12, the dielectric polarizations extend from the outer electrodes 16a and 16c toward the middle electrode 16b, and from the outer electrodes 18a and 18c toward the middle electrode 18b. On the side surfaces 11c and 11d (that is, the surfaces extending between the top and bottom surfaces 11a and 11b) of the outer vibrator arms 11, dielectric polarizations extend from the electrodes 16a and 16c on the bottom surface 11b toward the electrodes 15a and 15c on the top surface 11a. On the sides of the middle vibrator arm 12, the dielectric polarization extends from the electrodes 18a and 18c on the bottom surface 12b toward the electrodes 17a and 17c on the top surface 12a.

In this manner, the dielectric polarization is created in the thickness direction (y-axis direction) by the presence of electric fields between the electrodes 15a and 16a, between electrodes 15c and 16c, between electrodes 17a and 18a, and between electrodes 17c and 18c, each pair being spaced apart in the y-axis direction. Specifically, the electric fields in the y-axis direction between the outer electrodes of the vibrator arms 11 produce dielectric polarization in the y-axis direction along the side surfaces 11c and 11d. Similarly, the electric fields in the y-axis direction between the outer electrodes of the vibrator arm 12 produces dielectric polarization in the y-axis direction along the side surfaces 12c and 12d.

When the vibrator is driven in the manner shown in FIG. 1B, the middle electrodes 15b, 16b, 17b and 18b of the vibrator arms 11 and 12 are grounded, the outer electrodes 15c and 16a of the vibrator arms 11 and the outer electrode 17a of the vibrator arm 12 are supplied with a first ac voltage signal having a positive (first) phase (as shown in FIG. 7A), and the outer electrodes 15a and 16c of the vibrator arms 11 and the outer electrode 17c of the vibrator arm 12 are supplied with a second ac voltage signal having a negative (second) phase (shown in FIG. 7B), the second phase being 180° out-of-phase relative to the first phase.

Consequently, at a particular point in time when the first ac voltage signal applies a positive voltage to the electrodes 15c, 16a and 17a, and the second ac voltage signal applies a negative voltage to the electrodes 15a, 16c and 17c, positive strains (indicated with the symbol "O") are created along the top surface 11a of the outer vibrator arms 11 between the electrodes 15a and 15b, and along the bottom surface 11b between the electrodes 16a and 16b, and negative strains (indicated with the symbol "x") are created between the electrodes 15b and 15c and between the electrodes 16b and 16c. Further, a positive strain (indicated with the symbol "O") is created along the side surface 11c of the outer vibrator arms 11 between the electrodes 15a and 16a, and a negative strain (indicated with the symbol "x") is created along the side surface lid between the electrodes 15c and 16c. In addition, a negative strain (indicated with the symbol "x") is created along the top surface 12a of the middle vibrator arm 12 between the electrodes 17a and 17b, and a positive strain (indicated with the symbol "O") is created between the electrodes 17b and 17c. Accordingly, at the particular point in time shown in FIG. 1B, the outer vibrator arms 11 bend in the +x direction and the middle vibrator arm 12 bends in the −x direction. As a result, the outer vibrator arms 11 and the middle vibrator arm 12 vibrate in opposite phases relations (that is, 180° out-of-phase).

Since the outer vibrator arms 11 are strained in response to the dielectric polarization between the electrodes 15a and 16a and between the electrodes 15c and 16c along the y-axis direction, in addition to the strains caused by dielectric polarization along the top and bottom surfaces 11a and 11b, the vibrator arms 11 have a bending moment in the x-axis direction which is greater than that of the conventional piezoelectric vibrators. In particular, the strains created along the side surfaces 11c and 11d of the vibrator arms 11 by the dielectric polarization between the electrodes 15a and 16a and between the electrodes 15c and 16c are located a long distance from the neutral plane O—O (refer to FIG. 6), and these strains contribute greatly to the large bending moment. Because of the large amplitude vibration in the x-axis direction of the outer vibrator arms 11, the middle vibrator arm 12 also vibrates at a large amplitude in the x-axis direction.

When this vibratory gyroscope is placed in a system which is rotated around the z axis, Coriolis force acts on the vibrator arms 11 and 12 in the y-axis direction (that is, perpendicular to the direction of vibration) to create a vibrational component. Because the outer vibrator arms 11 and middle vibrator arm 12 are driven to vibrate in the x-axis direction in opposite phase relations, the vibration components attributable to Coriolis force of the outer vibrator arms 11 and the middle vibrator arm 12 have opposite phase relations. For example, if the vibrational component of the outer vibrator arms 11 swings in the +y direction at a particular point in time, the middle vibrator arm 12 swings in the -y direction.

The vibration component caused by the Coriolis force is detected by the electrodes 18a and 18c formed on the bottom surface 12b of the middle vibrator arm 12. The portions of piezoelectric material where the electrodes 18a and 18c are formed have the same direction of dielectric polarization, and the vibration component caused by Coriolis force is in the y-axis direction. Therefore, the strains applied to these portions of dielectric material are the same. Accordingly, the electrodes 18a and 18c provide detection voltages having a common phase resulting from the vibration component caused by Coriolis force.

FIG. 1C shows another method of driving the vibrator arms which produces dielectric polarizations in the directions shown in FIG. 1A. The electrodes 15c and 16a of the outer vibrator arms 11 are supplied with a positive (first) ac driving voltage having a common phase, a ground voltage is applied to the electrodes 15a and 16c, and the electrode 17a of the middle vibrator arm 12 is supplied with the positive ac voltage. The electrode 17c of the middle vibrator arm 12 is supplied with a negative (second) ac driving voltage which is opposite in phase to the first ac driving voltage.

The directions of strains (indicated with the symbol "O" and "x") created on the vibrator arms 11 and 12 at a particular point in time are the same as those of the embodiment shown in FIG. 1B. By way of comparison, ac driving voltages having opposite phases are applied to the electrodes 15a and 15c in the embodiment of FIG. 1B, resulting in a 2-fold voltage application between these electrodes, whereas the positive ac driving voltage is applied to the electrode 15c against the grounded electrode 15a in the case of FIG. 1C. Accordingly, the voltage difference between the electrodes 15a and 15c in the case shown in FIG. 1C is smaller when compared with the case of FIG. 1B, and therefore the strains between the electrodes 15a and 15b and between the electrode 16a and 16b are smaller than the case of FIG. 1B. Also, the strains between the electrodes 15b and 15c and between the electrode 16b and 16c in the case of FIG. 1C are smaller than the case of FIG. 1B. Namely, at the top and bottom surfaces 11a and 11b, the strains are smaller than the case of FIG. 1B.

As with the case of FIG. 1B, strains are created between the electrodes 15a and 16a on the side surface 11c and between the electrodes 15c and 16c on the opposite side surface 11d in the case of FIG. 1C. Because these strains are created at locations far from the neutral plane O—O, and the outer vibrator arms 11 are driven in the x-axis direction by a relatively large moment.

Measurement of the vibrational component by the middle vibrator arm 12 of the case of FIG. 1C is the same as the case of FIG. 1B. Specifically, the positive and negative ac driving voltages of opposite phase are applied to the outer electrodes 17a and 17c, the middle electrode 17b is grounded, and the middle vibrator arm 12 vibrates in an opposite phase relative to that of the outer vibrator arms 11. The vibration component of Coriolis force is detected in the form of voltages of the same phase by the electrodes 18a and 18c.

FIGS. 2A to 2D show the second embodiment of the present invention. Dielectric polarizations are produced in this embodiment by grounding the electrodes 15b, 16b, 17b and 18b, and applying a positive voltage to the electrodes 15a, 16c, 17c and 18a and a negative voltage to the electrodes 15c, 16a, 17a and 18c, as shown in FIG. 2A. The dielectric polarizations produced by the electric field between the electrodes are in the directions shown by the arrows.

FIGS. 2B, 2C and 2D show methods for driving the piezoelectric vibrator of the second embodiment. In the case of FIG. 2B, the electrodes 15b, 16b, 17b and 18b are grounded, the electrodes 15a, 15c, 17a and 17c are supplied with the positive (first) ac driving voltage, and the electrodes 16a and 16c are supplied with the negative (second) ac driving voltage, the negative ac driving voltage being opposite in phase to that of the positive ac driving voltage. Consequently, the outer vibrator arms 11 and the middle vibrator arm 12 are driven in opposite phase relations in the x-axis direction. Similarly, in the cases shown in FIGS. 2C and 2D, the outer vibrator arms 11 and the middle vibrator arm 12 are driven in the opposite phase relation in the x-axis direction, although these cases are different in ac driving voltage application from the case of FIG. 2B.

In any of the cases shown in FIGS. 2B, 2C and 2D, the electrodes 18a and 18c on the bottom surface 12b of the middle vibrator arm 12 serve to detect the vibration component caused by Coriolis force. The portions of piezoelectric vibrator where the electrodes 18a and 18c are formed are opposite in dielectric polarization, but have the same direction of the 15 vibration component of Coriolis force. Accordingly, the vibration component of Coriolis force is detected in different phases by the electrodes 18a and 18c and converted into a voltage signal by means of a differential circuit.

The driving methods shown in FIGS. 2B and 2D create strains between the electrodes 15a and 15b, between the electrodes 15b and 15c, between the electrodes 16a and 16b and between the electrodes 16b and 16c along the top and bottom surfaces 11a and 11b of the vibrator arms 11, and create strains between the electrodes 15a and 16a and between the electrodes 15c and 16c along the side surfaces 11c and 11d. Consequently, the vibrator arms 11 are driven in the x-axis direction by these strains and have a large vibration amplitude while consuming a small amount of power.

In the case of FIG. 2C, the electrodes 15a and 15c on the top surface 11a have the same (positive) voltage and the electrodes 16a and 16c on the bottom surface 11b have the same (ground) voltage. Accordingly, no strains are created on the top and bottom surfaces 11a and 11b, and strains are created only between the electrodes 15a and 16a and between the electrodes 15c and 16c on the side surfaces 11c and 11d. Based on the strains created at the side surfaces 11c and 11d, which are located a long distance from the neutral plane O—O, the vibrator arms 11 are driven by a relatively large moment in the x-axis direction.

FIGS. 3A to 3D show the third embodiment of the present invention. In this embodiment, a positive voltage is supplied to the electrodes 15a, 16c, 17c and 18a of the vibrator arms 11 and 12, a negative voltage is supplied to the electrodes 15c, 16a, 17a and 18c, and the middle electrodes 15b, 16b, 17b and 18b are supplied with no voltage, as shown in FIG. 3A.

Accordingly, the top surfaces 11a of the vibrator arms 11 have electric fields in the direction from the electrode 15a to the electrode 15c, and the bottom surfaces 11b have electric fields in the direction from the electrode 16c to the electrode 16a. Similarly, the middle vibrator arm 12 has electric fields in the direction from the electrode 17c to the electrode 17a on the top surface 12a, and from the electrode 18a to the electrode 18c on the bottom surface 12b. These electric field directions are the directions of dielectric polarization.

Both side surfaces 11c and 11d of the vibrator arms 11 have electric fields in the directions from the electrode 15a to the electrode 16a, and from the electrode 16c to the electrode 15c, so that dielectric polarization is produced in these directions. Similarly, the vibrator arm 12 has electric fields in the directions from the electrode 18a to the electrode 17a, and from the electrode 17c to the electrode 18c, so that the dielectric polarization is produced in these directions.

FIGS. 3B, 3C and 3D show methods for driving the vibrator. In response to the application of opposite ac driving voltages, the outer vibrator arms 11 and the middle vibrator arm 12 are driven in opposite phase relations in the x-axis direction. The vibration component in the y-axis direction caused by the Coriolis force is detected by the electrodes 18a and 18b of the middle vibrator arm 12. The vibration components of opposite phases are differentially processed before evaluation.

In the case of FIG. 3C, the same (positive) ac driving voltage is applied to the electrodes 15a and 15c on the top surface 11a, and the opposite (negative) ac driving voltage is applied to the electrodes 16a and 16c on the bottom surface 11b. Accordingly, no strains are created along the top and bottom surfaces 11a and 11b. Conversely, strains are created between the electrodes 15a and 16a and between the electrodes 15c and 16c along the side surfaces 11c and 11d. Based on the strains created at the side surfaces 11c and 11d which are located at a maximum distance from the neutral plane O—O, the vibrator arms 11 are subjected to a large bending moment in the x-axis direction.

FIGS. 4A and 4B show the fourth embodiment of the present invention. In this embodiment, dielectric polarization is produced by grounding the electrodes 15a, 15c and 16b of the vibrator arms 11 and the electrodes 17a, 17c and 18b of the middle vibrator arm 12, and applying a positive voltage to the electrodes 16a, 16c, 18a and 18c and a negative voltage to the electrodes 15b and 17b, as shown in FIG. 4A. Accordingly, electric fields are produced in the outer vibrator arms 11 in the directions from the electrode 15a to the electrode 15b and from the electrode 15c to the electrode 15b on the top surfaces 11a, and from the electrode 16a to the electrode 16b and from the electrode 16c to the 16b on the bottom surfaces 11b. The applied voltages also produce electric fields between the top and bottom surfaces 11a and 11b in the direction from the electrode 16a to the electrodes 15a and 15b and from the electrode 16c to the electrodes 15b and 15c. Dielectric polarization is produced along these electric field directions.

Similarly, electric fields are produced in the middle vibrator arm 12 in the directions from the electrode 17a to the electrode 17b and from the electrode 17c to the electrode 17b on the top surface 12a, and in the directions from the electrode 18a to the electrode 18b and from the electrode 18c to the electrode 18b on the bottom surface 12b. The applied voltages also produce electric fields in the directions from the electrode 18a to the electrodes 17a and 17b and from the electrode 18c to the electrodes 17b and 17c. Dielectric polarization is produced along these electric field directions.

FIG. 4B shows a method for driving the vibrator arms 11 and 12 in accordance with the fourth embodiment, with dielectric polarization being produced as described above. As shown, the electrodes 15b and 16b of the outer vibrator arms 11 are grounded, and electrodes 16a and 16c are respectively supplied with positive and negative ac driving voltages (that is, having opposite phase relations). At a particular point in time, positive strains (indicated with the symbol "O") are created between the electrodes 15a and 15b and between the electrodes 16a and 15b, and negative strains (indicated with the symbol "x") are created between the electrodes 16c and 16b and between the electrodes 16c and 15b.

In the middle vibrator arm 12, the electrodes 17b and 18b are grounded, and the electrodes 18a and 18c are respectively supplied with negative and positive ac driving voltages (that is, in a pattern opposite to the positive/negative ac driving voltages supplied to the electrodes 16a and 16c). Accordingly, at a particular point in time, negative strains (indicated with the symbol "x") are created between the electrodes 18a and 18b and between the electrodes 18a and 17b, and positive strains (indicated with the symbol "O") are created between the electrodes 18b and 18c and between the electrodes 18c and 17b.

Consequently, the outer vibrator arms 11 and the middle vibrator arm 12 vibrate in the opposite phase relations in the x-axis direction. For the vibrator arms 11, strains are created not only at the bottom surface 11b, but between the electrodes 16a and 15b and between the electrodes 16c and 15b (diagonally through the piezoelectric material). For the middle vibrator arm 12, strains are created between the electrodes 18a and 17b and between the electrodes 18c and 17b. Consequently, the vibrator arms 11 and 12 have large bending moments in the x-axis direction, and vibrate at a large amplitude in the x-axis direction.

The vibration component caused by the Coriolis force is detected by the electrodes 15a and 15c provided on the top surfaces 11a of the vibrator arms 11 and the electrodes 17a and 17c provided on the top surface 12a of the middle vibrator arm 12. The vibrator arms 11 and 12 vibrate in the opposite phase relation in the y-axis direction due to the Coriolis force, and therefore the electrodes 15a and 15c of the outer vibrator arms 11 and the electrodes 17a and 17c of the middle vibrator arm 12 provide detection voltages of opposite phases. These output voltages are differentially processed to evaluate the magnitude of is vibration component caused by the Coriolis force.

FIG. 6 shows the details of the vibrator arms 11 shown in FIGS. 1A to 1C. Each vibrator arm 11 has a dimension L1 in the x-axis direction and a dimension L2 in the y-axis direction, which meet the condition L2=2·L1.

With the application of −V and +V relative to the ground voltage applied to the electrodes 15a and 15b, the electrodes 15a and 15b have a voltage difference of V and the electrodes 15a and 16a have a voltage difference of 2·V. The electrodes 15a and 16a that are separated by a distance L2 (the thickness of the vibrator arm 11) in the y-axis direction which is twice the distance L1 separating the electrodes 15a and 15b. Accordingly, the density of electric field between the electrodes 15a and 15b is equal to the density of electric field between the electrodes 15a and 16a, and the polarizability is equal at the section between the electrodes 15a and 15b and at the section between the electrodes 15a and 16a.

When ac driving voltages of opposite phases shown in FIGS. 7A and 7B are applied to the electrodes 15a and 16a based on the driving method shown in FIG. 1B, the piezoelectric material of the section between the electrodes 15a and 15b and that of the section between the electrodes 15a and 16a are subjected to electric fields having a common strength. Accordingly, the positive strain caused by the piezoelectric effect along portions on the top and bottom surfaces 11a and 11b is equal to the positive strain caused by the piezoelectric effect along a portion on the side surface 11c. Namely, the strain distribution is constant at the left-hand sections of the top and bottom surfaces 11a and 11b with respect to the neutral plane O—O and at the side surface 11c, and the vibrator arm 11 is driven in the x-axis direction in a well-balanced state.

In order for the vibrator arm 11 to have an efficient bending vibration in the x-axis direction, it is desirable to have a larger strain at the section along the side surface 11c than the strains at the sections between the electrodes 15a and 15b and between the electrodes 16a and 16b. This difference in applied strain is accomplished by providing a larger electric field strength to the section along the side surface 11c than the electric field strength at the sections between the electrodes 15a and 15b and between the electrodes 16a and 16b during application of the ac driving voltage. To accomplish this goal, the dimension L2 in the y-axis direction is made smaller than the dimension 2·L1 in the x-axis direction, and the electrodes 15a and 16a are supplied with −V and +V, respectively, when dielectric polarization is generated. Consequently, it becomes possible to polarize the piezoelectric material between the electrodes 15a and 16a to a great extent, and to produce a large electric field during driving, thereby creating large strains.

As described above, the inventive piezoelectric vibrator generates dielectric polarization not only along the top and bottom surfaces of the vibrator arms, but also along the side sections between the top and bottom surfaces, causing the resulting strains to contribute greatly to the moment of vibration, thereby greatly enhancing driving efficiency. Particularly, the production of dielectric polarization along the thickness (y-axis) direction at both edges of the vibrator arms creates large strains at positions far from the neutral plane, enabling the piezoelectric vibrator to vibrate at a large amplitude at a small power consumption.

The vibratory gyroscope using the foregoing vibrator arms operates with a small power consumption and has a high vibration driving efficiency.

The inventive piezoelectric vibrator is applicable not only to vibratory gyroscopes, but also to other devices such as piezoelectric bells.

What is claimed is:

1. A piezoelectric vibrator comprising:
    a main vibrator body formed of a piezoelectric material, the main vibrator body having a top surface, a bottom surface and opposing first and second side surfaces respectively extending between said top and bottom surfaces;
    a first electrode formed on said top surface adjacent said first side surface;
    a second electrode formed on said top surface adjacent said second side surface;
    a third electrode formed on said bottom surface adjacent said first side surface;
    a fourth electrode formed on said bottom surface adjacent said second side surface;
    DC circuitry for applying DC voltages to said first, second, third and fourth electrodes to create a potential difference at least between said first and third electrodes and between said second and fourth electrodes, thereby developing in said main vibrator body a first dielectric polarization between said first and third electrodes, a second dielectric polarization between said second and fourth electrodes, a third dielectric polarization between said first and second electrodes and a fourth dielectric polarization between said third and fourth electrodes; and
    AC circuitry for applying AC voltages to at least two of said first, second, third and fourth electrodes to vibrate said main vibrator body in a direction parallel to said top and bottom surfaces.

2. A vibratory gyroscope comprising:
    at least one vibrator arm formed of a piezoelectric material, said vibrator arm having a top surface, a bottom surface and opposing first and second side surfaces respectively extending between said top and bottom surfaces;
    a first electrode formed on said top surface adjacent said first side surface;
    a second electrode formed on said top surface adjacent said second side surface;
    a third electrode formed on said bottom surface adjacent said first side surface;
    a fourth electrode formed on said bottom surface adjacent said second side surface;
    DC circuitry for applying DC voltages to said first, second, third and fourth electrodes to create a potential difference at least between said first and third electrodes and between said second and fourth electrodes, thereby developing in said vibrator arm a first dielectric polarization between said first and third electrodes, a second dielectric polarization between said second and fourth electrodes, a third dielectric polarization between said first and second electrodes and a fourth dielectric polarization between said third and fourth electrodes;
    AC circuitry for applying AC voltages to at least two of said first, second, third and fourth electrodes to vibrate said vibrator arm in a direction parallel to said top and bottom surfaces; and
    at least one detecting electrode for detecting a rotation of said vibrator arm, said detecting electrode being selected among the electrodes to which the AC voltage is not applied.

3. A vibratory gyroscope according to claim 2, wherein said gyroscope includes three vibrator arms having one ends merged together and extending in parallel in the shape of a three-tined fork;
    said detecting electrode is provided on at least one of said three vibration arms;
    said DC circuitry applies DC voltages to said first, second, third and fourth electrodes of each of said three vibration arms to develop said first, second, third and fourth dielectric polarization in each of said three vibration arms; and said AC circuitry applies AC voltages to at least two of said first, second, third and forth electrodes of each of said three vibration arms so that the two outer vibration arms will vibrate in the same direction and the middle vibration arm will vibrate in a direction opposite to that of said outer vibration arms.

4. A method for driving a piezoelectric vibrator including a main vibrator body formed of a piezoelectric material, said main vibrator body having a top surface, a bottom surface and opposing first and second side surfaces respectively extending between said top and bottom surfaces, said method comprising the steps of:

providing a first electrode formed on said top surface adjacent said first side surface, a second electrode formed on said top surface adjacent said second side surface, a third electrode formed on said bottom surface adjacent said first side surface, and a fourth electrode formed on said bottom surface adjacent said second side surface;

applying DC voltages to said first, second, third and fourth electrodes to create a potential difference at least between said first and third electrodes and between said second and fourth electrodes, thereby developing in said main vibration body a first dielectric polarization between said first and third electrodes, a second dielectric polarization between said second and fourth electrodes, a third dielectric polarization between said first and second electrodes and a fourth dialectic polarization between said third and fourth electrodes;

applying AC voltages to at least two of said first, second, third and fourth electrodes to vibrate said main vibrator body in a direction parallel to said top and bottom surfaces.

5. The method according to claim 4, wherein said step of providing said first, second, third and fourth electrodes includes a step of providing a fifth electrode formed on said top surface between said first and second electrodes, and said step of applying AC voltages includes a step of applying a positive AC voltage to two diagonal electrodes and a negative AC voltage to the other two diagonal electrodes and a step of applying a ground potential to said fifth electrode, wherein electric fields generated between said first and third electrodes and between said second and fourth electrodes are stronger than an electric filed generated between said first and fifth electrodes or between said fifth and second electrodes.

6. A piezoelectric vibrator according to claim 1, wherein a direction of said first dielectric polarization and a direction of said second dielectric polarization are opposite to each other.

7. A piezoelectric vibrator according to claim 1, wherein a direction of said first dielectric polarization and a direction of said second dielectric polarization are the same.

8. A piezoelectric vibrator according to claim 1, wherein said main vibrator body is rectangular in cross section and the width of said side surface is smaller than that of said top or bottom surface.

9. A vibratory gyroscope according to claim 3, wherein in said middle vibration arm, a direction of said first dielectric polarization and a direction of said second dielectric polarization are opposite to each other.

10. A vibratory gyroscope according to claim 9, wherein directions of said first, second, third and fourth dielectric polarizations in said two outer vibration arms are the same respectively but opposite respectively to those in said middle vibration arm.

11. A vibratory gyroscope according to claim 9, wherein directions of said first, second, third and fourth dielectric polarizations in said three vibration arms are the same respectively.

12. A vibratory gyroscope according to claim 3, wherein in said middle vibration arm, a direction of said first dielectric polarization and a direction of said second dielectric polarization are the same.

13. A vibratory gyroscope according to claim 10, wherein directions of said first, second, third and fourth dielectric polarizations in said two outer vibration arms are the same respectively but opposite respectively to those in said middle vibration arm.

14. A vibratory gyroscope according to claim 10, wherein directions of said first, second, third and fourth dielectric polarizations in said three vibration arms are the same respectively.

15. A vibratory gyroscope according to claim 3, wherein said three vibration arms are rectangular in cross section, and the width of said side surface is smaller than that of said top or bottom surface in each of said three vibration arms.

16. A method for driving a piezoelectric vibrator according to claim 4, wherein a direction of said first dielectric polarization and a direction of said second dielectric polarization are opposite to each other.

17. A method for driving a piezoelectric vibrator according to claim 4, wherein a direction of said first dielectric polarization and a direction of said second dielectric polarization are the same.

* * * * *

UNITED STATES PATENT AND TRADEMARK OFFICE
CERTIFICATE OF CORRECTION

PATENT NO. : 5,942,839
DATED : August 24, 1999
INVENTOR(S) : Kazumasa Ohnishi et al.

It is certified that error appears in the above-indentified patent and that said Letters Patent is hereby corrected as shown below:

<u>In the Claims</u>
Col. 12:
In claim 3, line 61, change "ends" to --end--.
Col. 13:
In claim 3, line 05, change "forth" to --fourth--.

In claim 4, line 31, change "dialectic" to --dielectric--.

In claim 5, line 49, change "filed" to --field--.
Col. 14:
In claim 13, line 29, change "10" to --12--.

In claim 14, line 34, change "10" to --12--.

Signed and Sealed this

Sixteenth Day of May, 2000

*Attest:*

Q. TODD DICKINSON

*Attesting Officer*  *Director of Patents and Trademarks*